US008565762B2

(12) United States Patent
Choi et al.

(10) Patent No.: US 8,565,762 B2
(45) Date of Patent: Oct. 22, 2013

(54) APPARATUS AND METHOD FOR SCANNING A HOME PUBLIC LAND MOBILE NETWORK IN A MOBILE COMMUNICATION TERMINAL

(75) Inventors: Yoon-Suk Choi, Daejeon (KR); Sang-Hyun Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1176 days.

(21) Appl. No.: 11/747,445

(22) Filed: May 11, 2007

(65) Prior Publication Data

US 2007/0270147 A1    Nov. 22, 2007

(30) Foreign Application Priority Data

May 17, 2006  (KR) ........................ 10-2006-0044237

(51) Int. Cl.
*H04W 4/00*  (2009.01)
(52) U.S. Cl.
USPC ..... 455/434; 455/435.1; 455/436; 455/161.1; 370/338
(58) Field of Classification Search
USPC ............... 455/432.1, 433, 434, 435.1–3, 436, 455/452.1
See application file for complete search history.

(56) References Cited

U.S. PATENT DOCUMENTS

| 5,787,347 | A | * | 7/1998 | Yu et al. ........................ 455/440 |
| 5,825,814 | A | * | 10/1998 | Detwiler et al. ............... 375/219 |
| 6,119,003 | A | * | 9/2000 | Kukkohovi ................. 455/435.2 |
| 2004/0224684 | A1 | | 11/2004 | Dorsey et al. |
| 2004/0266428 | A1 | * | 12/2004 | Aaltonen ................... 455/432.1 |
| 2005/0128988 | A1 | * | 6/2005 | Simpson et al. ............. 370/338 |

FOREIGN PATENT DOCUMENTS

| KR | 1020050007977 | 1/2005 |
| WO | WO 2004/102926 A2 | 11/2004 |
| WO | WO 2005/112358 | 11/2005 |
| WO | WO 2005/112359 | 11/2005 |

OTHER PUBLICATIONS

Digital cellular telecommunications system (Phase 2); functions related to Mobile Station (MS) in idle mode (GSM 03.22); Draft pr ETS 300 535, ETSI Standards, Fourth Edition, Mar. 1996.
Digital Cellular Telecommunications System (Phase 2+); Functions Related to Mobile. Station (MS) in Idle Mode and Group Receive Mode, (GSM 03.22 Version 7.3.0 Release 1998). ETSI TS 100 930 V7.3.0. Dec. 1999.

* cited by examiner

*Primary Examiner* — Wesley Kim
*Assistant Examiner* — Joseph Dean, Jr.
(74) *Attorney, Agent, or Firm* — The Farrell Law Firm, P.C.

(57) ABSTRACT

Provided are an apparatus and a method for scanning a Home Public Land Mobile Network (Home PLMN) in a mobile communication terminal that includes the operations of determining an operation mode of the mobile communication terminal, if a Home PLMN scanning timer expires, and setting a flag to indicate that the Home PLMN scanning timer expires, if the mobile communication terminal is determined to be in a non-idle mode. As a result, the Home PLMN can be searched as fast as possible.

7 Claims, 2 Drawing Sheets

APPARATUS AND METHOD FOR SCANNING A HOME PUBLIC LAND MOBILE NETWORK IN A MOBILE COMMUNICATION TERMINAL

PRIORITY

This application claims priority under 35 U.S.C. §119 to an application entitled "Apparatus And Method For Scanning Home Public Land Mobile Network In Mobile Communication Terminal" filed in the Korean Intellectual Property Office on May 17, 2006 and assigned Serial No. 2006-44237, the contents of which are incorporated herein by reference.

BACKGROUND OF THE INVENTION

1. Field of the Invention

The present invention relates generally to a mobile communication terminal, and in particular, to an apparatus and a method for scanning Home Public Land Mobile Network (Home PLMN) in a mobile communication terminal.

2. Description of the Related Art

Mobile communication terminals no longer have a service area limited within a network, as they support a roaming service and can use mobile communication in any part of the world just like in a single network. The Public Land Mobile Network (PLMN) enables mobile communication service providers to provide roaming of the telecommunications service, and mainly includes a Base Transceiver Subsystem (BTS), a subscriber location registration device and a mobile communication exchanger. The Home Public Land Mobile Network (Home PLMN) is the PLMN registered by the user to receive service of a certain service provider.

The second, or the third generation mobile communication systems provided by the European Telecommunications Standards Institute (ETSI) or the 3rd Generation Partnership Project (3GPP) suggest that a mobile communication terminal periodically scan the Home PLMN based on the Home PLMN scanning time stored in the Subscriber Identity Module (SIM), if the mobile communication terminal receives service via the Visitor Public Land Mobile Network (VPLMN), instead of the Home PLMN. Simply, the mobile communication terminal carries out Home PLMN searching periodically, by scanning the Home PLMN if the scanning timer expires, and starting the scanning timer if the Home PLMN scanning is finished.

If the scanning timer expires, the periodical Home PLMN searching is carried out only in an idle mode of the mobile communication terminal, that is, the periodic Home PLMN searching is not carried out in a non-idle mode in which the mobile communication terminal is transmitting data or Short Message Service (SMS), or conducting a call. The mobile communication terminal does not attempt the Home PLMN searching if the Home PLMN scanning timer expires during the transmission of SMS or data, or conducting of a call, but instead starts the Home PLMN scanning timer. If this situation continues, there will not be an attempt to search the Home PLMN for a considerable length of time, and accordingly, the mobile communication terminal is left in the VPLMN even where there is a home PLMN available.

SUMMARY OF THE INVENTION

An object of the present invention is to substantially solve at least the above problems and/or disadvantages and to provide at least the advantages below. Accordingly, an object of the present invention is to provide an apparatus and method for scanning Home Public Land Mobile Network (Home PLMN) in a mobile communication terminal.

According to one aspect of the present invention, there is provided a method for scanning a Home Public Land Mobile Network (Home PLMN) in a mobile communication terminal that includes determining an operation mode of the mobile communication terminal, if a Home PLMN scanning timer has expired; and setting a flag to indicate that the Home PLMN scanning timer expires, if the mobile communication terminal is determined to be in a non-idle mode.

According to another aspect of the present invention, there is provided an apparatus for scanning a Home Public Land Mobile Network (Home PLMN) in a mobile communication terminal that includes a controller for determining an operation mode of the mobile communication terminal if a Home PLMN scanning timer expires, and if it is determined that the mobile communication terminal is in a non-idle mode, setting a flag to indicate that the Home PLMN scanning timer has expired, mode and omitting a re-starting of the Home PLMN scanning timer, and if the mobile communication terminal returns to an idle mode, determining if the flag is set and performing the Home PLMN scanning; and a Subscriber Identity Module (SIM) which stores a value for the Home PLMN scanning timer.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

An apparatus and a method for scanning Home Public Land Mobile Network (Home PLMN) of a mobile communication terminal according to the present invention are described herein-below.

Figure 1:
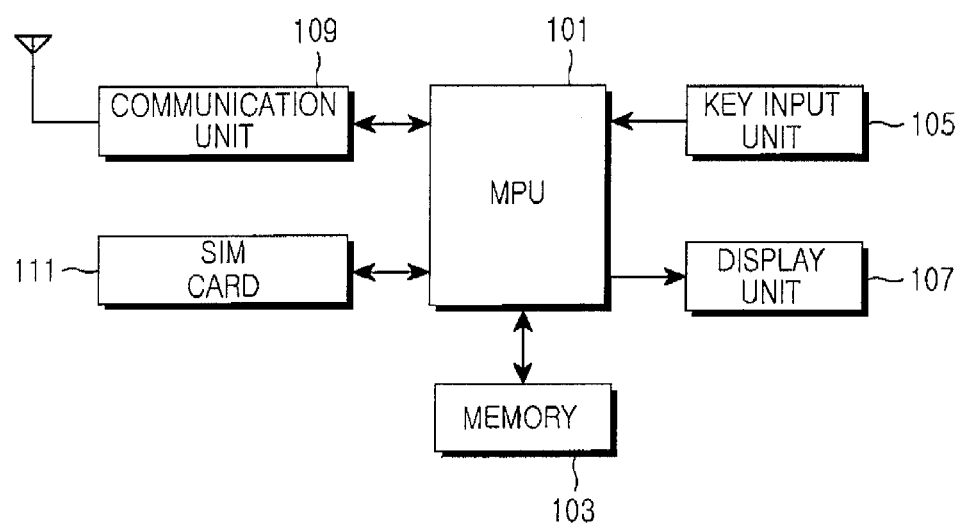
FIG. 1 is a block diagram illustrating a mobile communication terminal according to the present invention.

FIG. 1 is a block diagram illustrating a mobile communication terminal according to the present invention. The mobile communication terminal may include a Micro-Processor Unit (MPU) 101, a memory 103, a key input unit 105, a display unit 107, a communication unit 109, and a Subscriber Identity Module (SIM) card 111.

The MPU 101 controls the overall operations of the mobile communication terminal. For example, the MPU 101 may carry out the usual processing and controlling of voice and data communications, and may further carry out the operations according to an aspect of the present invention such as setting a flag if a Home PLMN scanning timer expires in a non-idle mode, and checking the flag and processing the Home PLMN scanning if the mobile communication terminal returns to the idle mode.

The memory 103 may include a Read Only Memory (ROM), a Random Access Memory (RAM), and a flash ROM. The ROM may store micro-codes of the processing and controlling programs of the MPU 101, together with other reference data. According to an aspect of the present invention, the ROM may also store a program according to which a flag is set if the Home PLMN scanning timer expires in a non-idle mode, and the flag is checked and the Home PLMN scanning is carried out if the mobile communication terminal returns to the idle mode. The RAM operates as a working memory of the MPU 101, and stores temporary data, which are generated as the programs are executed. The flash ROM stores updatable data.

The key input unit 105 may include a variety of function keys including, but is not limited to, numeral buttons 0~9, menu button (Menu), cancel button (Delete), confirm button, call button (Talk), end button (End), Internet logon button, navigation keys or direction keys (▲ ▼ ◀ ▶), and provide the controller 101 with the key input data according to the key that the user presses. The display unit 107 may display status information of the mobile communication terminal, which is generated during operation, a limited number of characters, and a high amount of moving and still images. The display unit 107 may be implemented as a color Liquid Crystal Display (LCD).

The communication unit 109 may process transmission and reception of wireless signal, which is received and transmitted through the antenna. For example, during transmission, the communication unit 109 may perform channel coding, spreading, and Radio Frequency (RF) conversion, and transmit the data. In reception, the communication unit 109 may perform dispreading and channel decoding of the R-F signal to recover the received data.

The Subscriber Identity Module (SIM) card 111 is a smart card, which is detachably mounted in the mobile communication terminal using Global System for Mobile Communication (GSM). A Universal Mobile Telecommunications System (UMTS) Subscriber Identity Module (UMTS SIM) may be used, and the subscriber information such as user password, data for the operation of mobile communication terminal, and data for network registration, are stored to the SIM card 111. According to one aspect of the present invention, the SIM card 111 further stores a value for the Home PLMN scanning timer.

It can be also described that the mobile communication terminal for scanning a Home Public Land Mobile Network (Home PLMN) comprises means for memorizing a Home PLMN scanning timer expiration if a Home PLMN scanning timer expires during an operation mode of the mobile communication terminal and means for starting a Home PLMN scanning just after the operation mode is completed. Here, the step of memorizing is performed by setting a flag to indicate that the Home PLMN scanning timer has expired. The mobile communication terminal further comprises a Subscriber Identity Module (SIM) for storing a value for the Home PLMN scanning timer. The SIM card comprises a Universal Mobile Telecommunications System (UMTS) Subscriber Identity Module (UMTS SIM) card.

Figure 2:
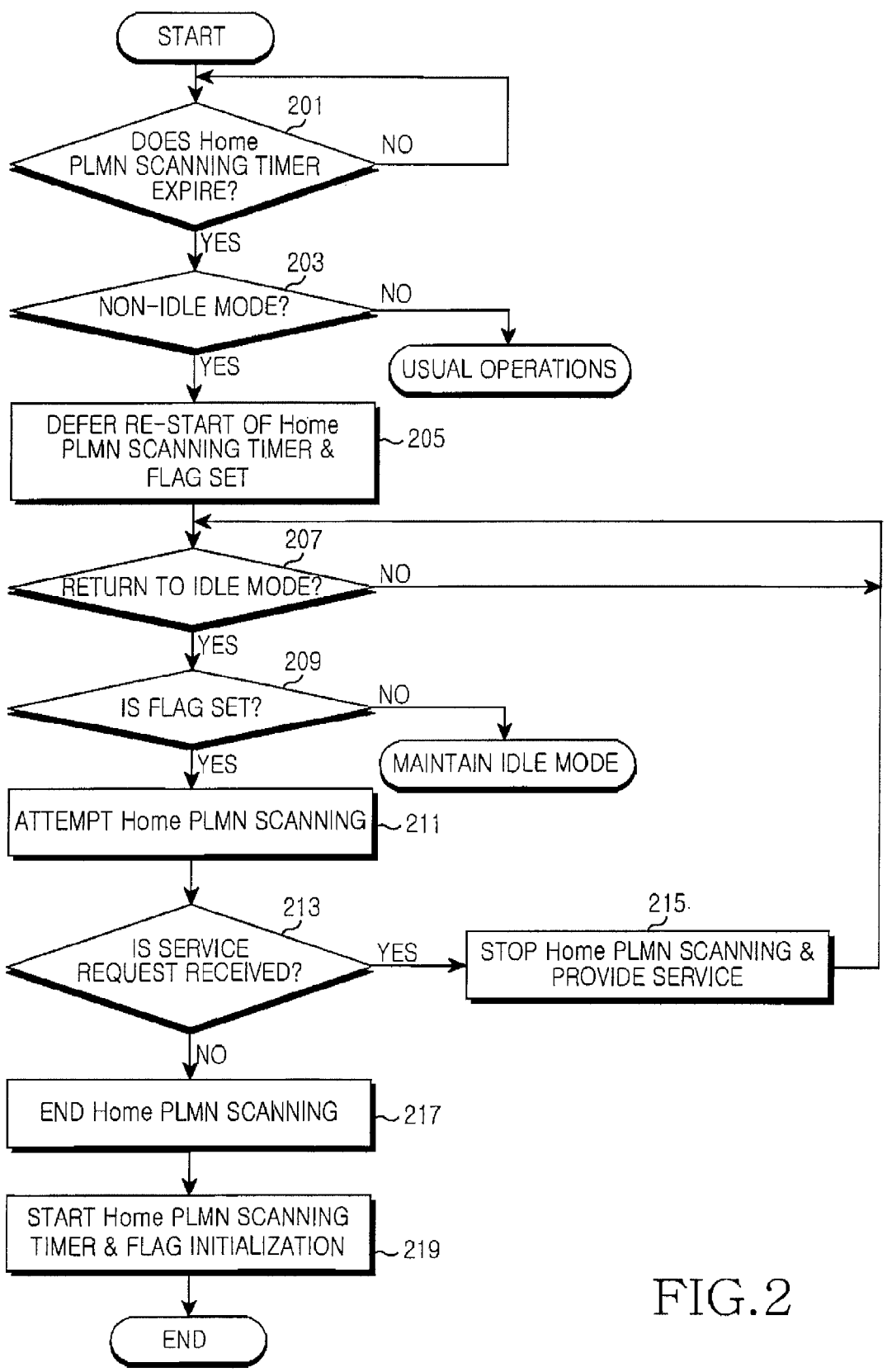
FIG. 2 is a flowchart illustrating the processes for scanning Home Public Land Mobile Network (Home PLMN) of a mobile communication terminal according to the present invention.

FIG. 2 is a flowchart illustrating the process for scanning Home Public Land Mobile Network (Home PLMN) of a mobile communication terminal according to the present invention.

Referring to FIG. 2, in step 201 the mobile communication terminal determines if the Home PLMN scanning timer has expired. The value for the Home PLMN scanning timer may be stored in advance to the SIM card 111. If it is determined that the Home PLMN scanning timer has expired, in step 203 the mobile communication terminal determines if it is operating in the non-idle mode, and if it is an idle mode, performs the usual functions. However, if it is determined that the mobile communication terminal is in non-idle mode, such as when the mobile communication terminal is currently transmitting data or Short Message Service (SMS), or performing a call, in step 205 the mobile communication terminal sets a flag, instead of re-starting the Home PLMN scanning timer, so that it can be indicated that the Home PLMN timer has expired in non-idle mode when the mobile communication terminal returns to the idle mode.

In step 207 the mobile communication terminal determines if it has returned to the idle mode. For example, the mobile communication terminal may return to the idle mode if the call is finished and thus, the mobility management connection is terminated, or if the SMS transmission is finished and thus, the mobility management connection is terminated, or if the data transmission is finished and thus, the Packet Data Protocol (PDP) is deactivated. If it is determined that the mobile communication terminal has returned to the idle mode, the mobile communication terminal goes to step 209 to determine if a flag is set to indicate that the Home PLMN scanning timer has expired in the non-idle mode. If the flag is not set, the mobile communication terminal maintains the idle mode, if a flag is set, the mobile communication terminal goes to step 211 to attempt the Home PLMN scanning based on the fact that the Home PLMN timer has expired.

After that, the mobile communication terminal goes to step 213 to determine if there is a service request such as a call, SMS, or data request received during the Home PLMN scanning operation. If it is determined that a service request is received, in step 215 the mobile communication terminal stops the Home PLMN scanning, provides the user with requested service, and returns to step 207. If a service request is not received, in step 217 the mobile communication terminal ends the Home PLMN scanning, goes to step 219 to start the Home PLMN scanning timer. At this time, the mobile communication terminal initializes the flag.

The mobile communication terminal ends the algorithm according to the present invention.

It can also be described that the method for scanning a Home Public Land Mobile Network (Home PLMN) in a mobile communication terminal comprises memorizing a Home PLMN scanning timer expiration if a Home PLMN scanning timer expires during an operation mode of the mobile communication terminal and starting a Home PLMN scanning just after the operation mode is completed. Here, the step of memorizing is performed by setting a flag to indicate that the Home PLMN scanning timer has expired.

As described above, according to the present invention, a mobile communication terminal sets a flag if a Home Public Land Mobile Network (Home PLMN) scanning timer has expired in a non-idle mode, and checks the flag upon returning to the idle mode to accordingly perform the Home PLMN scanning. Accordingly, the problem of not attempting a Home PLMN search for a lengthy period of time, and the mobile communication terminal staying in the Visitor Public Land Mobile Network (VPLMN) even when there is a Home PLMN available r, can be solved, and the Home PLMN can be searched rapidly.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for scanning a Home Public Land Mobile Network (Home PLMN) in a mobile communication terminal, comprising:
   if a Home PLMN scanning timer expires, determining an operation mode of the mobile communication terminal;
   if the mobile communication terminal is determined to be in a non-idle mode, setting a flag to indicate that the Home PLMN scanning timer has expired;
   if a service request is detected during Home PLMN scanning, terminating the Home PLMN scanning, providing a service according to the service request, and, upon a completion of the provided service, resuming the terminated Home PLMN scanning without re-starting the Home PLMN scanning timer and without waiting for another expiration of the PLMN scanning timer;
   if the mobile communication terminal returns to an idle mode, determining whether the flag is set, and, upon a determination that the flag is set, performing the Home PLMN scanning; and
   if the Home PLMN scanning ends upon expiration of the Home PLMN scanning timer, re-starting the Home PLMN scanning timer and initializing the flag,
   wherein the Home PLMN scanning timer is stored in a Subscriber Identity Module (SIM).

2. An apparatus for scanning a Home Public Land Mobile Network (Home PLMN) in a mobile communication terminal, comprising:
   a controller for determining an operation mode of the mobile communication terminal if a Home PLMN scanning timer expires, and if it is determined that the mobile communication terminal is in a non-idle mode, setting a flag to indicate that the Home PLMN scanning timer has expired in the non-idle mode and omitting a re-starting of the Home PLMN scanning timer, and if the mobile communication terminal returns to an idle mode, determining if the flag is set and performing the Home PLMN scanning; and
   a Subscriber Identity Module (SIM) for storing a value for the Home PLMN scanning timer,
   wherein if a service request is detected during Home PLMN scanning, the controller terminates the Home PLMN scanning, provides a service according to the service request, and, upon a completion of the provided service, resumes the terminated Home PLMN scanning without waiting for another expiration of the PLMN scanning timer.

3. The apparatus of claim 2, wherein if the Home PLMN scanning is ended the controller re-starts the Home PLMN scanning timer and initializes the flag.

4. The apparatus of claim 2, wherein the SIM card comprises a Universal Mobile Telecommunications System (UMTS) Subscriber Identity Module (UMTS SIM) card.

5. A method for scanning a Home Public Land Mobile Network (Home PLMN) in a mobile communication terminal, comprising:
   memorizing a Home PLMN scanning timer expiration by setting a flag to indicate that the Home PLMN scanning timer has expired if a Home PLMN scanning timer expires during an operation mode of the mobile communication terminal;
   starting a Home PLMN scanning just after the operation mode is completed; and
   if a service request is detected during Home PLMN scanning, terminating the Home PLMN scanning, providing a service according to the service request, and, upon a completion of the provided service, resuming the terminated Home PLMN scanning without waiting for another expiration of the PLMN scanning timer,
   wherein the Home PLMN scanning timer is stored in a Subscriber Identity Module (SIM).

6. A mobile communication terminal for scanning a Home Public Land Mobile Network (Home PLMN), comprising:
   means for memorizing a Home PLMN scanning timer expiration by setting a flag to indicate that the Home PLMN scanning timer has expired if a Home PLMN scanning timer expires during an operation mode of the mobile communication terminal;
   means for starting a Home PLMN scanning just after the operation mode is completed; and
   means for, if a service request is detected during Home PLMN scanning, terminating the Home PLMN scanning, providing a service according to the service request, and, upon a completion of the provided service, resuming the terminated Home PLMN scanning without waiting for another expiration of the PLMN scanning timer,
   wherein the Home PLMN scanning timer is stored in a Subscriber Identity Module (SIM).

7. The mobile communication terminal of claim 6, wherein the SIM card comprises a Universal Mobile Telecommunications System (UMTS) Subscriber Identity Module (UMTS SIM) card.

* * * * *